(12) United States Patent
Schoetz et al.

(10) Patent No.: US 8,544,299 B2
(45) Date of Patent: Oct. 1, 2013

(54) QUARTZ GLASS TUBE AS A SEMIFINISHED PRODUCT FOR PREFORM AND FIBER MANUFACTURE, AND METHOD FOR MAKING THE QUARTZ GLASS TUBE

(75) Inventors: Gerhard Schoetz, Aschaffenburg (DE); Karsten Braeuer, Bruchkoebel (DE); Jan Vydra, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 340 days.

(21) Appl. No.: 12/448,998

(22) PCT Filed: Jan. 15, 2008

(86) PCT No.: PCT/EP2008/050381
§ 371 (c)(1),
(2), (4) Date: Jul. 17, 2009

(87) PCT Pub. No.: WO2008/087132
PCT Pub. Date: Jul. 24, 2008

(65) Prior Publication Data
US 2010/0034998 A1  Feb. 11, 2010

(30) Foreign Application Priority Data
Jan. 19, 2007  (DE) .......................... 10 2007 003 889

(51) Int. Cl.
*C03B 37/018* (2006.01)
(52) U.S. Cl.
USPC .................. 65/391; 65/397; 65/413; 65/420; 65/421; 65/435; 65/439; 428/542.8
(58) Field of Classification Search
None
See application file for complete search history.

(56) References Cited

U.S. PATENT DOCUMENTS

| 5,090,979 A | | 2/1992 | Le Sergent et al. |
| 5,158,587 A | * | 10/1992 | Kyoto et al. ................... 65/398 |

(Continued)

FOREIGN PATENT DOCUMENTS

| DE | 103 16 487 A1 | 11/2004 |
| EP | 1 000 909 A | 5/2000 |
| GB | 2208114 A * | 3/1989 |
| WO | WO 2008/003613 A | 1/2008 |

OTHER PUBLICATIONS

Machine Translation of EP 1 000 909 (May 2000).*

(Continued)

*Primary Examiner* — Matthew Daniels
*Assistant Examiner* — Lisa Herring
(74) *Attorney, Agent, or Firm* — Tiajoloff and Kelly LLP

(57) ABSTRACT

To improve a known method for making a quartz glass tube as a semifinished product for the manufacture of optical fibers, the tube comprising an inner fluorine-doped quartz glass layer and an outer quartz glass layer, so as to achieve inexpensive manufacture and improved dimensional stability of the quartz glass tube, it is suggested according to the invention that the quartz glass of the inner layer should be produced in a first plasma deposition process with formation of an inner layer having a wall thickness of at least 1.5 mm, with a fluorine content of at least 1.5% by wt. being set in the quartz glass, and that the quartz glass of the outer layer should be produced in a second plasma deposition process and deposited directly or indirectly on the inner layer with formation of a composite tube, and that the composite tube should be elongated into the quartz glass tube.

8 Claims, 1 Drawing Sheet

(56) References Cited

U.S. PATENT DOCUMENTS

Figure 1:
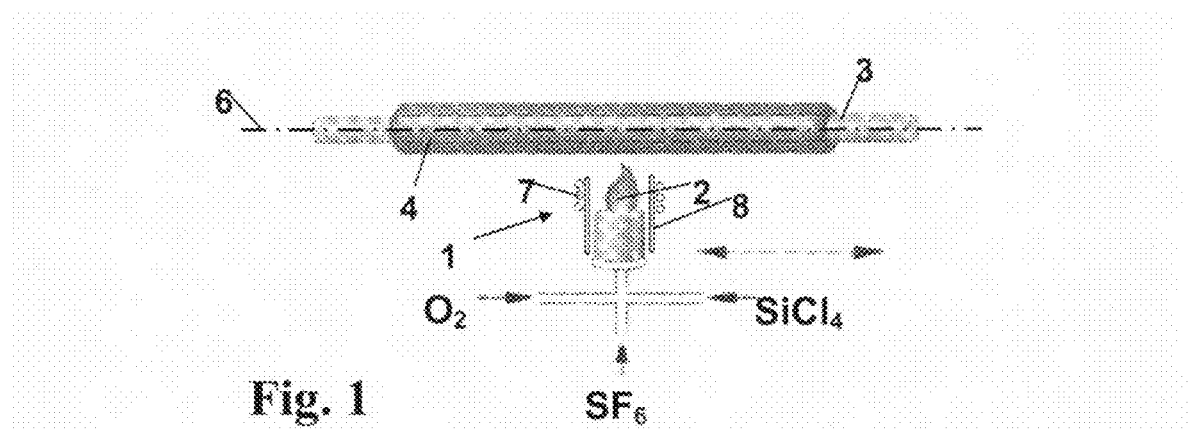

| | | |
|---|---|---|
| 6,253,580 B1 | 7/2001 | Gouskov et al. |
| 6,516,636 B1 * | 2/2003 | Gansicke et al. .............. 65/379 |
| 6,536,240 B1 * | 3/2003 | Gouskov et al. .............. 65/391 |
| 2002/0144521 A1 | 10/2002 | Orcel et al. |
| 2002/0186942 A1 * | 12/2002 | Bubnov et al. .............. 385/123 |
| 2004/0159124 A1 | 8/2004 | Atkins et al. |
| 2005/0229639 A1 * | 10/2005 | Otosaka et al. .............. 65/391 |
| 2005/0262876 A1 | 12/2005 | Jourdier et al. |
| 2006/0213228 A1 * | 9/2006 | Schotz et al. .............. 65/377 |
| 2006/0213231 A1 | 9/2006 | Atkins et al. |
| 2009/0260400 A1 * | 10/2009 | Schoetz et al. .............. 65/391 |

OTHER PUBLICATIONS

Huenlich T, et al, Fiber-Preform Fabrication Using Plasma Technology: A Review, Journal of Optical Communications, Fachverlag Schiele & Schon, Berlin, DE, vol. 8, No. 4, 1987.

* cited by examiner

QUARTZ GLASS TUBE AS A SEMIFINISHED PRODUCT FOR PREFORM AND FIBER MANUFACTURE, AND METHOD FOR MAKING THE QUARTZ GLASS TUBE

The present invention relates to a quartz glass tube as a semifinished product for preform and fiber manufacture, said tube comprising an inner fluorine-doped quartz glass layer and an outer quartz glass layer, and to a method for making such a quartz glass tube.

Fluorine reduces the refractive index of quartz glass. Tubes of fluorine-doped quartz glass are therefore used for making preforms for optical fibers of a predetermined radial refractive-index profile, for instance in the form of so-called "substrate tubes" for the MCVD process (modified vapor deposition) or as cladding tubes in the rod-in-tube technique. Fluorine doping, however, effects a decrease in the viscosity of the quartz glass, which may lead to undesired deformations in the further processing of the semifinished product.

An obvious solution of the problem by using thicker tubes is normally already ruled out because of the predetermined radial refractive-index profile of the optical fibers to be produced and for reasons of costs, and turns out to be particularly disadvantageous in the MCVD process also because of the poor heat transfer of quartz glass.

A different solution of the problem is described in U.S. Pat. No. 5,090,979 A, which also discloses a quartz glass tube and a method of the above-mentioned type. This document suggests a substrate tube for use in an MCVD method, which tube is configured as a composite tube consisting of a fluorine-doped inner layer and an outer support layer of quartz glass. The support layer has a higher viscosity than the fluorine-doped inner layer, so that it contributes to an altogether higher thermal stability of the tube in the further processing of the substrate tube in the MCVD process. According to the embodiment the thicknesses of support layer and inner layer are each 1 mm, the fluorine concentration of the quartz glass of the inner layer being 1%.

It is suggested for the making of the composite tube that a tube of undoped quartz glass should be collapsed onto a tube of fluorine-doped quartz glass. Or inversely, a tube of fluorine-doped quartz glass should be fused into the inner bore of a tube made of undoped quartz glass.

A great number of the standardized refractive-index profiles are complex and require high refractive-index leaps on neighboring layers. The known quartz glass tube cannot be used in unlimited form for setting such profiles. On the one hand, this is due to the relatively low fluorine concentration in the inner layer. On the other hand, the collapsing of tubes with the comparatively thin wall thickness of 1 mm poses very great problems and might easily lead to deformations and distortions and other defects at the interface. On the other hand, the manufacture of fluorine-doped quartz glass tubes is very expensive, especially in the case of high fluorine concentrations, so that the wall thickness of the tube is normally configured to have only a dimension that is absolutely necessary.

It is therefore the object of the present invention to provide a method for the inexpensive manufacture of a dimensionally accurate quartz glass tube as a semifinished product for preform and fiber manufacture. Moreover, it is the object of the present invention to provide an inexpensive quartz glass tube of high quality.

As for the method, this object starting from the above-mentioned method is achieved according to the invention in that that the quartz glass of the inner layer is produced in a first plasma deposition process with formation of an inner layer having a wall thickness of at least 1.5 mm, with a fluorine content of at least 1.5% by wt. being set in the quartz glass, and that the quartz glass of the outer layer is produced in a second plasma deposition process and is deposited directly or indirectly on the inner layer with formation of a composite tube, and that the composite tube is elongated into the quartz glass tube.

In the method according to the invention, the quartz glass earmarked for the inner layer and also the quartz glass earmarked for the outer layer are produced by means of a plasma deposition method. Use is here made of an induction-coupled plasma burner which is fed with start substances from which $SiO_2$ particles undoped in the plasma flame or fluorine-containing $SiO_2$ particles are formed that are deposited layer by layer on a carrier rotating about its longitudinal axis and are directly sintered in this process. This method for producing quartz glass for optical fibers is also generally known under the designation "POD method (plasma outside deposition).

An advantage of the POD method is that particularly high fluorine contents of more than 1.5% by wt. (approximately up to 8% by wt.) can be introduced into quartz glass, which is accompanied by a correspondingly significant reduction of the refractive index and the possibility of forming a larger refractive index leap.

Since both layers of the composite tube can be produced by means of a POD method the same facility can be used and retrofitting work or the provision of otherwise needed equipment can be avoided. This simplifies production, reduces the risk of waste material and makes the production of the composite tube cheaper on the whole. Moreover, this measure also has a positive effect on the quality of the boundary surface.

What is particularly important is however that a mechanically stable inner layer of fluorine-doped quartz glass can first of all be provided with an adequately large layer thickness of at least 1.5 mm for further processing into the quartz glass tube. The inner layer may thus also be configured in the form of an inner tube, for such a thick-walled quartz glass tube shows an adequately high mechanical and also thermal stability and can therefore be handled more easily in subsequent processing steps. Particular mention should here be made of the hot process for applying the outer layer in a further POD process.

The inner layer is immediately obtained through a POD deposition process or it is produced, being then present in the form of an inner tube, by elongation of a thick-walled start tube. The maximum thickness of the inner layer is restricted not so much because of physical limits, but solely because of technical facilities.

An outer layer of quartz glass, which is not doped with fluorine or only doped in a small concentration, is applied to the inner layer directly or via one or several intermediate layers. The result is a thick-walled composite tube.

However, for the above reasons the thick-walled tube layer of fluorine-doped quartz glass is normally superfluous for the manufacture of preforms and it would also present a high cost factor. Therefore, a further process step is provided according to the invention, wherein the more thick-walled composite tube is elongated into a more thin-walled quartz glass tube with the desired dimensions.

The total length of the resulting quartz glass tube is many times greater than that of the initial composite tube.

It is only in the quartz glass tube that the inner layer and the outer layer are present in the layer thicknesses predetermined for further processing into preform or fiber. To be more specific, the inner layer that is doped with fluorine and particularly expensive is thus made as thick as necessary, but as thin as possible.

The quartz glass tube can be employed as a substrate tube for use in an MCVD method, as an overcladding tube in preform production according to the so-called rod-in-tube technique, as a cladding tube for making so-called PCF fibers (photonic crystal fibers) or as a semifinished product for other manufacturing methods for preforms and optical fibers and as fiber lasers or fiber amplifiers.

Thus the method according to the invention permits—through a sophisticated sequence of measures which comprise the provision of a thermally stable inner layer, the layer build-up by POD deposition and the final elongation of the composite tube, a comparatively simple, reproducible and inexpensive manufacture of a geometrically exact high-quality quartz glass tube with a support layer of high-viscosity quartz glass and with an inner layer of quartz glass with homogeneous fluorine doping.

Preferred is a procedure in which an inner layer is produced with a layer thickness of at least 5 mm, preferably at least 10 mm.

An inner layer with a wall thickness of more than 5 mm, preferably more than 10 mm, is distinguished by high mechanical and thermal stability, so that handling is simplified in subsequent processing steps. This is also true for an inner layer present in tubular form. Moreover, the manufacture of the inner layer gets less expensive with an increasing layer/wall thickness.

It has turned out to be particularly useful when the quartz glass of the outer layer is doped with a substance enhancing the viscosity of quartz glass.

Dopants enhancing the viscosity of quartz glass are e.g. nitrogen or aluminum. The viscosity-enhancing effect of the dopants additionally contributes to the thermal stability of the outer layer. Especially nitrogen can easily be incorporated into the quartz glass network in the POD process by supplying a nitrogen-containing gas, such as $NH_3$ or $N_2O$, to the plasma burner. Upon use of $NH_3$, however, the formation of hydroxyl groups must also be taken into account.

Furthermore, it turns out as advantageous when an inner layer is produced with a layer thickness of less than 1 mm.

The comparatively expensive fluorine-doped quartz glass is here only provided with a small layer thickness of less than 1 mm, so that the corresponding quartz glass tube is relatively inexpensive. However, an inner layer with a layer thickness of less than 100 μm only shows an insignificant optical effect.

According to a preferred variant of the method an outer layer is produced with a layer thickness of less than 1 mm.

It has been found that in the MCVD process or in other processing procedures in which the quartz glass tube is exposed to a high temperature, high fluorine content may lead to the formation of bubbles. In the variant of the method as is described here, the outer layer serves not so much the thermal stabilization of the quartz glass tube, but just prevents such a bubble formation by said outer layer acting as a barrier layer to the out-diffusion of fluorine out of the inner layer. Moreover, the barrier layer that is not doped with fluorine can provide a better boundary area for a further, outwardly adjoining quartz glass layer.

An outer layer with a layer thickness of less than 50 μm is however not preferred for reasons of handling because it can get easily damaged by cleaning the quartz glass tube or by other measures.

In an alternative and equally preferred variant of the method, an outer layer is produced with a layer thickness of more than 1 mm.

In this process the outer layer substantially serves thermal stabilization of the quartz glass tube. It has been found that this effect is particularly great in the case of layer thicknesses of more than 1 mm. The maximum layer thickness depends on the purpose intended for the respective quartz glass tube. For instance, layer thicknesses of more than 10 mm are not desired in an application as a substrate tube in an MCVD method because they restrict heat supply from the outside, whereas much larger layer thicknesses may be desired and useful in an application of the quartz glass tube as an overcladding tube.

Moreover, it has turned out to be useful when during elongation of the composite tube a draw ratio is set in the range of from 3 to 100.

The larger the draw ratio (the ratio of tube lengths after and before the elongation process) is, the smaller are the manufacturing efforts associated with the length of the resulting quartz glass tube. At draw ratios of less than the said lower limit there is no significant contribution in this respect. At draw ratios above the said upper limit composite tubes must be used that have a very large volume and are difficult to handle.

Preferably, the inner bore of the resulting quartz glass tube is formed without any tools during elongation.

An inner surface smoothed by hot deformation and of a particularly high surface quality is obtained during elongation.

As for the quartz glass tube the above-mentioned object starting from a quartz glass of the above-mentioned type is achieved according to the invention in that the quartz glass of the inner layer has a fluorine content of at least 1.5% by wt. and a mean hydroxyl group content in the range of from 0 to 50 wt ppm and an inner bore formed in the melt without any tools.

The quartz glass tube according to the invention can be produced by means of the above-described method according to the invention. It has an inner layer of quartz glass that on the one hand is distinguished by a comparatively high mean fluorine content and on the other hand by a comparatively low mean hydroxyl group content. On account of the low hydroxyl group content the quartz glass tube can also be used for near-core regions of an optical fiber if the working wavelength thereof is influenced by the presence of hydroxyl groups. Such a quartz glass can be produced by means of a plasma deposition process using hydrogen-free or low-hydrogen plasma. Likewise, the quartz glass of the outer layer, which contains no or little fluorine in comparison with the quartz glass of the inner layer, is produced by means of a plasma deposition process.

The inner bore of the quartz glass tube according to the invention has an inner wall formed in the melt without any tools. The smooth high-quality surface of the inner bore is e.g. obtained by producing the quartz glass tube by elongation of a more thick-walled composite tube.

The high-quality quartz glass tube of the invention thus comprises a support layer of high-viscosity quartz glass and an inner layer of fluorine-doped quartz glass.

Advantageous developments of the quartz glass tube according to the invention become apparent from the subclaims. Insofar as developments of the quartz glass tube indicated in the subclaims imitate the procedures specified in subclaims regarding the method according to the invention, reference is made for supplementary explanation to the above observations regarding the corresponding method claims. The developments of the quartz glass tube of the invention as outlined in the remaining subclaims shall be explained in more detail hereinafter.

Preferably, the quartz glass of the inner layer has a mean hydroxyl group content in the range of from 0.1 to 5 wt ppm.

The lower the hydroxyl group content, the more suited is the quartz glass tube for use in the near-core area of an optical fiber.

The setting of particularly low hydroxyl group content requires considerable efforts. As a rule, however, a higher hydroxyl group content is acceptable for the outer layer. Therefore, for reasons of costs an embodiment of the quartz glass tube according to the invention is preferred where the quartz glass of the outer layer has a mean hydroxyl group content in the range of 0 to 300 wt ppm, preferably in the range of 1 to 50 wt ppm.

The quartz glass tube according to the invention can be employed as a substrate tube for use in an MCVD method for making preforms for optical fibers, as an overcladding tube in preform production according to the so-called rod-in-tube technique, as a cladding tube for making so-called PCF fibers (photonic crystal fibers) or as a semifinished product for other manufacturing methods for preforms and optical fibers and for fiber lasers and fiber amplifiers.

Figure 2:
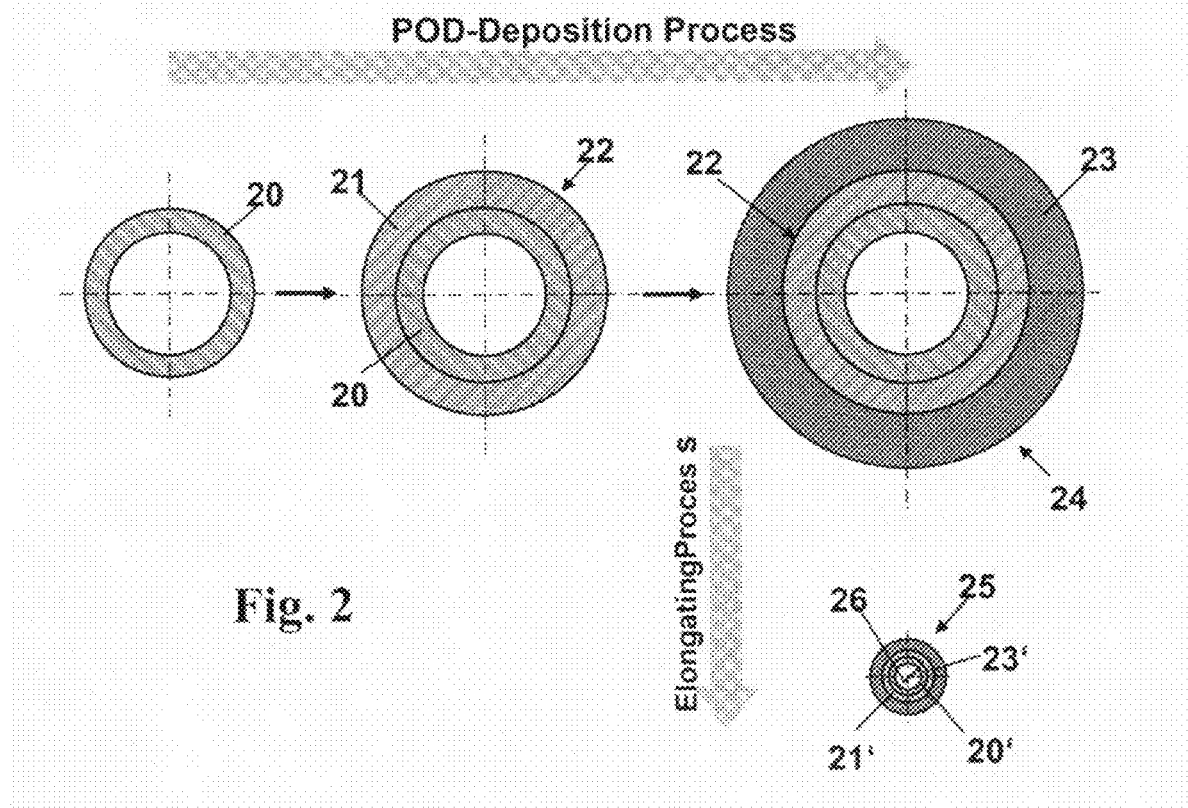

The invention shall now be explained in more detail with reference to embodiments and a patent drawing. The drawing is a schematic illustration showing in detail in:

FIG. 1 an apparatus for performing the POD method for depositing fluorine-doped quartz glass; and FIG. 2 an illustration for producing an embodiment of the quartz glass tube according to the invention with individual method steps and intermediate products.

EXAMPLE 1

FIG. 1 schematically shows a device for performing a method for depositing fluorine-doped quartz glass on a carrier tube 3. The carrier tube 3 consists of undoped quartz glass and has an inner diameter of 34 mm and an outer diameter of 40 mm.

A layer 4 of fluorine-doped quartz glass is produced on the carrier tube 3 by means of a standard POD method. To this end $SiCl_4$, oxygen and $SF_6$ are supplied to a plasma burner 1 and are converted into $SiO_2$ particles in a burner flame 2 assigned to the plasma burner 1. The $SiO_2$ particles are deposited layer by layer on the outer cylindrical surface of the carrier tube 3, which is rotating about its longitudinal axis 6, in that the plasma burner 1 is reversingly moved along the carrier tube 3 from one end to the other end. It is thereby possible to incorporate a high fluorine concentration of 5% by wt. with a homogeneous axial and radial distribution in the quartz glass network of the layer 4. The plasma flame 2 is produced inside a reaction sleeve 8 of quartz glass that is surrounded by a high-frequency coil 7.

The rotational speed of the carrier tube 3 and the translational speed of the plasma burner 1 are set such that the individual quartz glass layers have a mean thickness of about 12 μm. A layer 4 of fluorine-doped quartz glass is thereby produced with a thickness of 15 mm.

The semifinished product coated in this way is then provided in a further POD deposition process, and in the same way as described for the fluorine-doped quartz glass, with an outer layer of undoped quartz glass. The $SF_6$ gas stream is here switched off. The thickness of the outer layer of the composite tube produced in this way is 1.43 mm.

After the deposition process has been completed, a heated etching gas stream of $SF_6$ is introduced into the bore of the carrier tube 3. The etching gas stream of $SF_6$ is dimensioned such that the carrier tube 3 is completely removed and it is only the glass layer 4 in tubular form with an inner diameter of 40 mm and a wall thickness of about 16.43 mm that is maintained. Machining of the inner bore of the tubular form (=composite tube) is not needed.

The resulting composite tube of fluorine-containing inner layer and undoped outer layer of quartz glass is drawn in an elongation process with a draw ratio of 25.75 without any tools into a thin-walled quartz glass tube having an outer diameter of 20 mm and a wall thickness of 2 mm and is inflated in this process. To this end an internal pressure raised by 5 mbar in comparison with the externally applied external pressure is maintained in the inner bore. The wall of the quartz glass tube is composed of an outer layer of undoped quartz glass having a thickness of 200 μm and an inner layer of quartz glass homogeneously doped with fluorine and having a thickness of 1.8 mm, and it is distinguished by an inner wall smoothed by hot formation and having a particularly high surface quality.

The resulting quartz glass tube is used as a substrate tube for making a preform for optical fibers. To this end pieces are cut from the quartz glass tube to the desired length. With the intended use the outer layer serves as a "passivation layer" that reduces the out-diffusion of fluorine from the inner layer and the accompanying bubble formation in the subsequent hot treatment steps. Moreover, it contributes to a low-defect contact and boundary surface in relation to an externally adjoining layer.

EXAMPLE 2

FIG. 2 schematically shows an inner tube 20 of quartz glass which is produced by means of POD deposition and homogeneously doped with 7% by wt. of fluorine. The tube 20 has an inner diameter of 20 mm and a wall thickness of 7 mm.

A second tube layer 21 with a layer thickness of 5 mm is produced on the inner tube 20 by means of POD deposition and this layer is homogeneously doped with 1.5% by wt. of fluorine.

The composite structure 22 consisting of inner tube 20 and second tube layer 21 of fluorine-doped quartz glass is then provided in a further POD deposition process and in the same way as described above with an outer layer 23 of undoped quartz glass with a layer thickness of 20 mm. The total wall thickness of the composite tube 24 produced in this way is thus 32 mm.

The composite tube 24 consisting of two-part fluorine-containing inner layer 20; 21 and undoped outer layer 23 of quartz glass is drawn in an elongation process with a draw ratio of 25.21 without any tools into a thin-walled quartz glass tube 25 having an outer diameter of 25 mm and a wall thickness of 3 mm. The wall of the quartz glass tube 25 is composed of an outer layer 23' of undoped quartz glass having a thickness of 2.23 mm and an inner layer with layers 20' (inside) with a thickness of 0.39 mm and 21' (outside) with a thickness of 0.38 mm of quartz glass with different fluorine dopings and with a total thickness of 3 mm, and it is distinguished by an inner wall 26 smoothed by hot formation and having a particularly high surface quality.

The resulting quartz glass tube is used as a substrate tube for making a preform for optical fibers. For this purpose pieces are cut from the quartz glass tube to the desired length. With the intended use the outer layer 23 serves as a "stabilization layer" for mechanically stiffening the fluorine-containing inner layer 20; 21 in the MCVD process. Moreover, it contributes to a low-defect contact and boundary surface in relation to an externally adjoining layer.

EXAMPLE 3

In a way similar to the method described with reference to Example 1, a carrier tube of undoped quartz glass is provided with an inner diameter of 30 mm and an outer diameter of 40 mm. A layer of quartz glass is produced on the carrier tube by means of the POD method with a thickness of 40 mm, the quartz glass being doped with fluorine in a concentration of 2.5% by wt.

Directly thereafter an outer layer of undoped quartz glass with a thickness of 2.05 mm is produced on the fluorine-doped quartz glass layer in a further POD process.

Following the completion of the deposition process, the carrier tube is removed by honing, so that only the glass layer produced in the POD method is obtained in tubular form with an inner diameter of 40 mm and a wall thickness of about 42.05. The resulting tube of fluorine-containing inner layer and undoped outer layer of quartz glass has an outer diameter of 124.1 mm and is drawn in an elongation process with a draw ratio of 38.35 without any tools into a thin-walled quartz glass tube having an outer diameter of 33 mm and a wall thickness of 3 mm. The wall of the quartz glass tube is composed of an outer layer of undoped quartz glass having a thickness of 200 μm and an inner layer of quartz glass homogeneously doped with fluorine and having a thickness of 2.8 mm, and it is distinguished by an inner wall smoothed by hot formation and having a particularly high surface quality. The mean hydroxyl group content of the inner layer is 5 wt ppm and that of the outer layer about 280 wt ppm.

The resulting quartz glass tube is used as an overcladding tube for making a preform for optical fibers. For this purpose pieces are cut from the quartz glass tube to the desired length. With the intended use the outer layer serves as a "passivation layer" that reduces the out-diffusion of fluorine from the inner layer and the accompanying bubble formation in the subsequent hot treatment steps. Moreover, it contributes to a low-defect contact and boundary surface in relation to an externally adjoining layer.

The invention claimed is:

1. A method for making a quartz glass tube as a semifinished product configured for making optical fibers, said tube having an inner fluorine-doped quartz glass layer and an outer quartz glass layer, said method comprising:
    producing the quartz glass of the inner fluorine-doped quartz glass layer in a first plasma deposition process so as to form on a carrier tube of quartz glass an inner layer having a wall thickness of at least 1.5 mm, with the quartz glass having a fluorine content of at least 1.5% by wt., and
    producing the quartz glass of the outer quartz glass layer in a second plasma deposition process depositing an outer layer thereof directly or indirectly on the inner layer so as to form a composite tube,
    said quartz glass of the outer layer having a viscosity and being doped with a substance that increases said viscosity relative to undoped quartz glass,
    said outer quartz glass layer not being doped with fluorine, or being doped with a fluorine content lower than the fluorine content of the inner quartz glass layer, and
    removing the carrier tube, and
    elongating the composite tube into the quartz glass tube.

2. The method according to claim 1, wherein the inner layer is produced with a wall thickness of at least 5 mm.

3. The method according to claim 1, wherein, after said elongation, the inner layer has a thickness of less than 1 mm.

4. The method according to claim 1, wherein an outer layer is produced having a layer thickness of less than 1 mm.

5. The method according to claim 1, wherein an outer layer is produced having a layer thickness of more than 1 mm.

6. The method according to claim 1, wherein during the elongation of the composite tube, a draw ratio thereof is set in a range from 3 to 100.

7. The method according to claim 1, wherein the elongation forms an inner bore in the resulting quartz glass tube without use of any tools.

8. The method according to claim 1, wherein the inner layer is produced with a wall thickness of at least 10 mm.

* * * * *